(12) United States Patent
Wendlandt et al.

(10) Patent No.: US 8,674,983 B1
(45) Date of Patent: Mar. 18, 2014

(54) SYSTEM AND METHOD FOR SYNCHRONIZING AND USING A THREE DIMENSIONAL VIEW WITH A BLOCK DIAGRAM MODEL

(75) Inventors: Jeff Wendlandt, Newton, MA (US); Brian Mirtich, Medfield, MA (US); Arnav Mukherjee, Newton, MA (US)

(73) Assignee: The MathWorks, Inc., Natick, MA (US)

( * ) Notice: Subject to any disclaimer, the term of this patent is extended or adjusted under 35 U.S.C. 154(b) by 396 days.

(21) Appl. No.: 12/835,247

(22) Filed: Jul. 13, 2010

Related U.S. Application Data

(63) Continuation-in-part of application No. 12/704,309, filed on Feb. 11, 2010, now Pat. No. 7,974,820, which is a continuation of application No. 11/891,550, filed on Aug. 10, 2007, now Pat. No. 7,689,389, which is a continuation of application No. 10/887,708, filed on Jul. 9, 2004, now Pat. No. 7,519,516.

(51) Int. Cl.
*G06T 17/00* (2006.01)

(52) U.S. Cl.
USPC .............................. 345/420; 345/581; 345/619

(58) Field of Classification Search
USPC ........................................................ 345/420
See application file for complete search history.

(56) References Cited

U.S. PATENT DOCUMENTS

| | | | |
|---|---|---|---|
| 5,808,616 A | 9/1998 | Shimizu | |
| 5,999,185 A | 12/1999 | Kato et al. | |
| 6,049,621 A | 4/2000 | Jain et al. | |
| 7,343,273 B2 | 3/2008 | Kusunoki et al. | |
| 2006/0106815 A1* | 5/2006 | Timcenko | 707/100 |

OTHER PUBLICATIONS

Dymola Daynamic Modeling Laboratory, User's Manual, Dynasim AB, 1992-2002. pp. 1-212.*
Bracewell, R.H. et al., "From Embodiment Generation to Virtual Prototyping," International Conference on Engineering Design, 6 pages, (1999).
Omura, George, "Master AutoCAD, Release 12," Sybex Inc., pp. 6-7, 622-623 (1992).
SolidWorks Corporation, "Comparing SolidWorks 2001 with Solid Edge V9, A technical comparison of SolidWorks 2001 and Solid Edge V9," pp. 1-13 (2001).

* cited by examiner

*Primary Examiner* — Phi Hoang
(74) *Attorney, Agent, or Firm* — Nelson Mullins Riley & Scarborough LLP

(57) ABSTRACT

A method of synchronizing a textual view, a block diagram view and a three-dimensional view of the system being modeled is provided. Aspects of the model can be displayed via a textual viewer, a block diagram viewer and a 3D viewer in an embodiment. A user may make a change to the block diagram representing the model via the block diagram viewer interface and changes may be dynamically made to the textual representation of the model via the textual viewer and to the 3D representation of the model via the 3D viewer. Exemplary embodiments may maintain synchronization of model views to allow dynamic updating of model views as determined by an environment in which the model views are operating.

11 Claims, 14 Drawing Sheets

```
function mb = four_bar(baseLength, topLength, leftLength, rightLength)
% Construct a four bar linkage with the given link lengths.

% Create bodies
mb = mech.Multibody;
mb.body(0, make_link('base',    baseLength,   'black', +1, +1)); ⎫
mb.addBody(make_link('top',     topLength,    'green', -1, -1)); ⎬ 902
mb.addBody(make_link('left',    leftLength,   'red',   -1, +1)); ⎪
mb.addBody(make_link('right',   rightLength,  'blue',  -1, +1)); ⎭

% Create joints
mb.addJoint(mech.Joint('left',   'revolute', 'base',  1, 'left',  1)); ⎫
mb.addJoint(mech.Joint('right',  'revolute', 'base',  2, 'right', 1)); ⎬ 904
mb.addJoint(mech.Joint('left2',  'revolute', 'left',  2, 'top',   1)); ⎪
mb.addJoint(mech.Joint('right2', 'revolute', 'right', 2, 'top',   2)); ⎭

% Gravity
mb.gravity = [0 -9.81 0];
```

```
function body = make_link(name, length, color, offsetDir1, offsetDir2)
% Construct a single link with the given name, length, and color. The offsetDir
% params indicate how to shift joint attachment frames perpendicular to the
% plane of motion.
    width = 0.1;
    thickness = 0.05;
    body = mech.Body;
    body.name = name;
    geom = rounded_rod(length, width, thickness);
    body.addFrame('one', math3d.Transform3([-length/2, 0, offsetDir1 * thickness/2]));
    body.addFrame('two', math3d.Transform3([+length/2, 0. offsetDir2 * thickness/2]));
    body.attachGraphic(mech.Graphic(geom, rgb(color)), '');
    body.attachInertia(mech.Inertia(geom), '');
end
```
← 906

SYSTEM AND METHOD FOR SYNCHRONIZING AND USING A THREE DIMENSIONAL VIEW WITH A BLOCK DIAGRAM MODEL

CROSS-REFERENCE TO RELATED APPLICATIONS

This application is a continuation-in-part under 35 U.S.C. §120 of U.S. patent application Ser. No. 12/704,309 filed Feb. 11, 2010, which is a continuation of U.S. patent application Ser. No. 11/891,550 filed Aug. 10, 2007, now U.S. Pat. No. 7,689,389 issued Mar. 30, 2010, which is a continuation of U.S. Pat. No. 7,519,516 issued Apr. 14, 2009 the disclosures of which are hereby incorporated by reference in their respective entireties.

BACKGROUND INFORMATION

Block diagrams enable complex systems to be modeled in a block diagram environment. In a block diagram environment, such as the Simulink® environment from The MathWorks of Natick, Mass., a block diagram model holds data representing system component attributes and functionality. The block diagram model is frequently represented in a block diagram view of the model. The block diagram view includes multiple blocks representing the system components as well as lines between blocks representing logical or physical connections between system components. The block diagram model may also be used to simulate the execution of the system being modeled. The results of the simulation may be presented with a basic two dimensional animation of the system being modeled. A more realistic three-dimensional animation of the system being modeled may also be presented to a user.

FIG. 1A (prior art) represents a block diagram 2 of a system being modeled, a four cylinder engine. The block diagram contains information about system components and connections between components that may be used by a simulator to run a simulation of the execution of the system. An animated depiction of the system being modeled may be displayed to a viewer during the simulation. An example of the animation of a system simulation may be seen in FIG. 1B (prior art), which represents a three-dimensional view 4 of the four cylinder engine represented in the block diagram 2. The three dimensional view 4 is produced by The Virtual Reality Toolbox™ for the MATLAB® programming environment. The Virtual Reality Toolbox™ may also be used with the SimMechanics™ application. The SimMechanics™ application is a mechanical body modeling application used in conjunction with the Simulink® environment.

A three-dimensional view of a system being modeled enables a user to connect bodies together, position the bodies, and orient the bodies in relationship to each other during construction and editing of a model when connected to a block diagram design environment. The three-dimensional view alleviates the need for extensive knowledge of the coordinate systems frequently required for the block diagram view of the system. It should be noted that although the term "three-dimensional" is used herein, the term "three-dimensional" refers to the impression of three-dimensions given to a user observing the view of the system being modeled. Those skilled in the art will understand that the three dimensional view of the system is frequently rendered on a two-dimensional display surface and is rendered so as to give the impression of a third-dimension (i.e., depth) on the two-dimensional surface.

In the block diagram view, such as that shown in FIG. 1A, it is frequently easier to create large hierarchical designs and/or use complicated force laws using Simulink® or SimMechanics than it is to create such designs or model such forces in a three-dimensional environment. However, conversely it is frequently more difficult to visualize the interrelationship of the various components of a system being modeled. Unfortunately, conventional block diagram environments do not allow a user to easily transition from a three-dimensional view of a system being modeled to a block diagram view of the system so as to utilize the positive aspects of both design environments.

BRIEF DESCRIPTION OF THE DRAWINGS

FIG. 9 illustrates an exemplary textual view of a model.

DETAILED DESCRIPTION

The illustrative embodiment of the present invention provides a method of synchronizing a three-dimensional view of a system being modeled in a block diagram environment with a block diagram view of the system being modeled. The three-dimensional view and the block diagram view are analyzed for corresponding points by a view generator in the block diagram environment. The features that are represented in both the block diagram view and the three-dimensional view are noted. Subsequent changes to a corresponding feature or component in one of the views are thereafter reflected in the other view. In one implementation, a user's changes to one of the views causes a dynamic updating of the other view while the change is still ongoing in the first view. In another implementation the second view is updated only after the completion of the changes in the first view. The synchronization of views enables a model builder to leverage the strengths of both types of views while constructing the block diagram model.

Figure 1A:
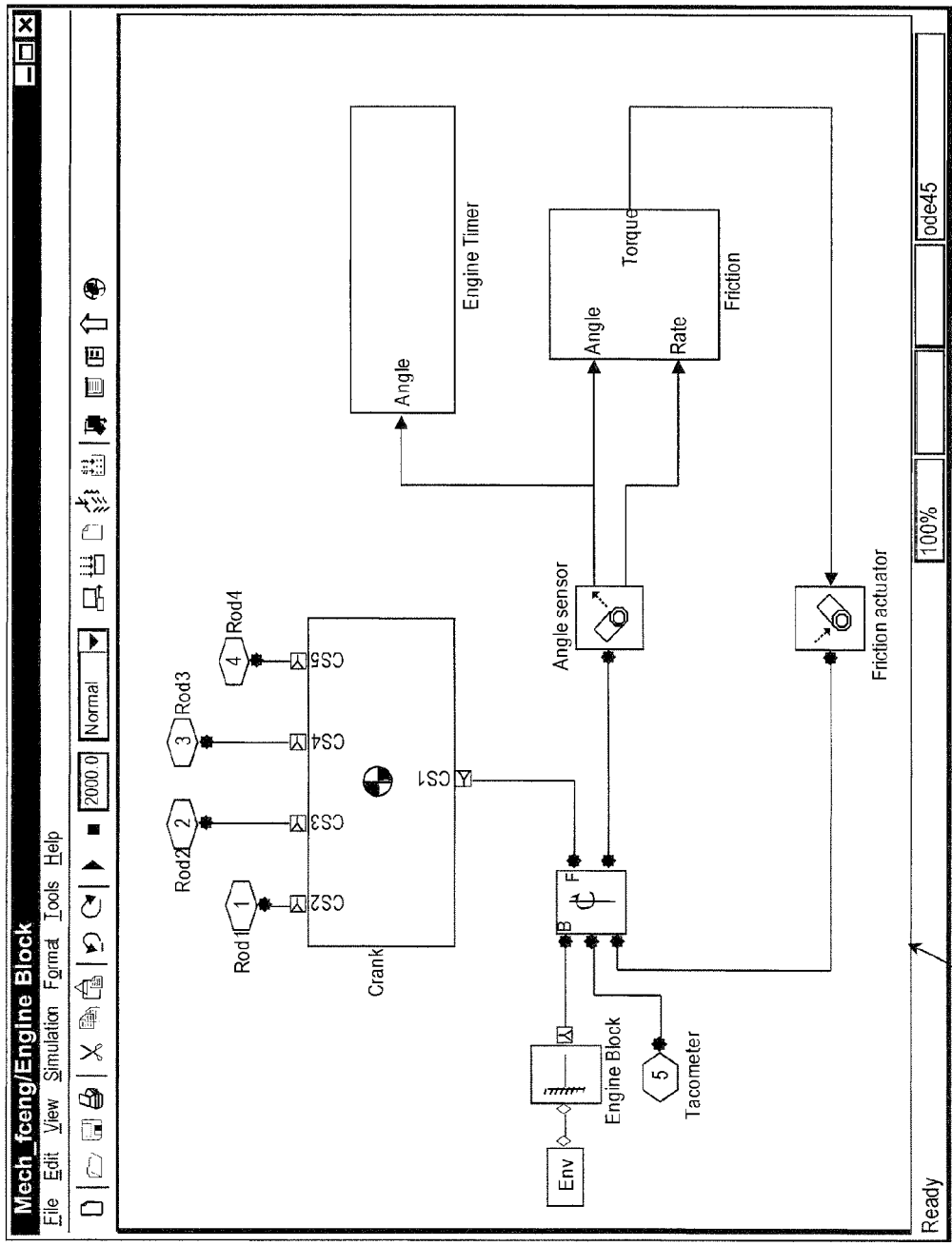
FIG. 1A (prior art) depicts a block diagram view of a 4 cylinder engine system.
Figure 1B:
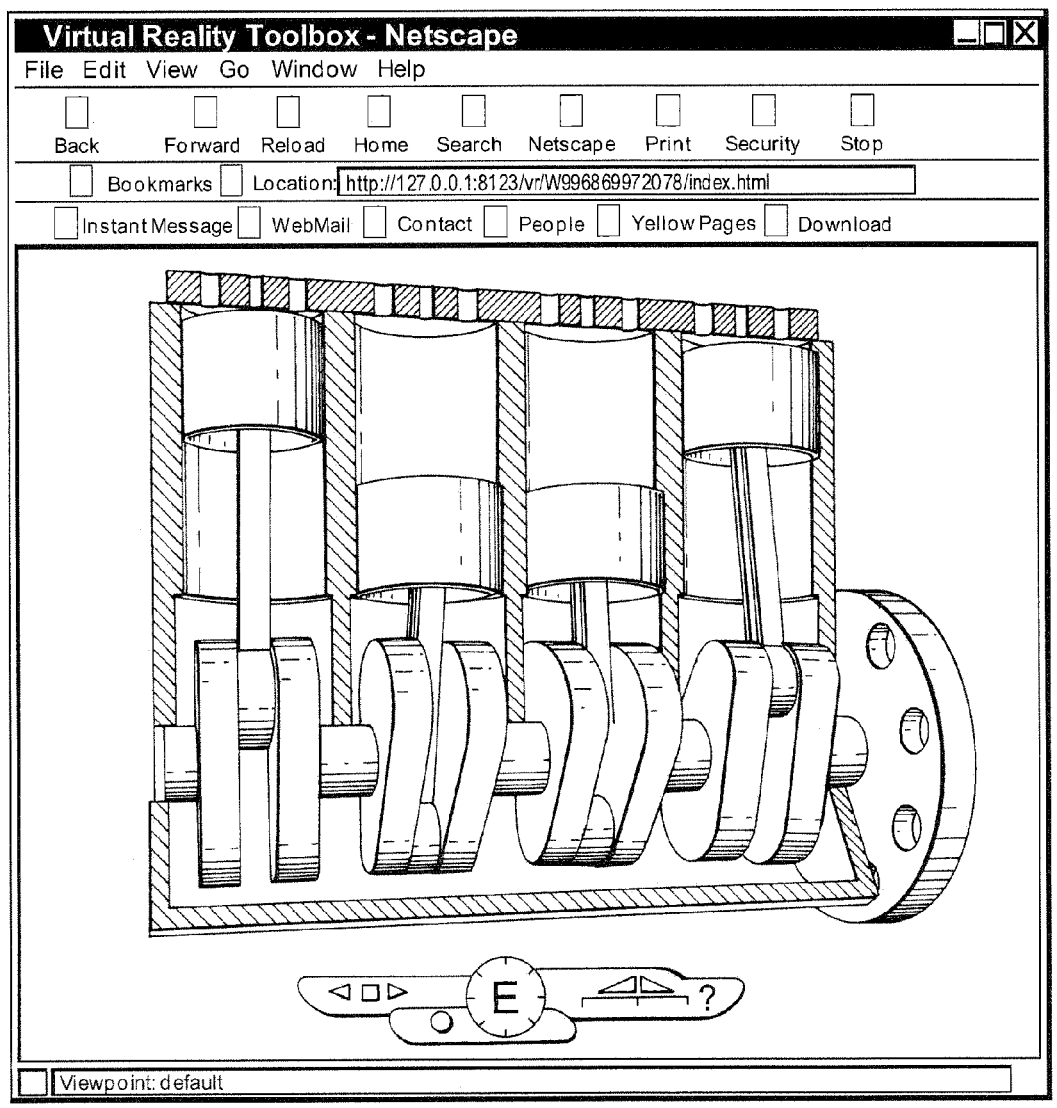
FIG. 1B (prior art) depicts a virtual reality toolbox representation of the 4 cylinder engine model of FIG. 1A.

The dimension of depth shown in FIG. 1B (prior art) enables a user to more readily appreciate the interaction of the various components of the 4-cylinder engine. The illustrative embodiment of the present invention integrates the depth perception of the three dimensional view previously used to display simulation results with the traditional block diagram design environment such that changes in the three-dimensional view are reflected in the two dimensional block diagram and vice-versa.

Figure 2:
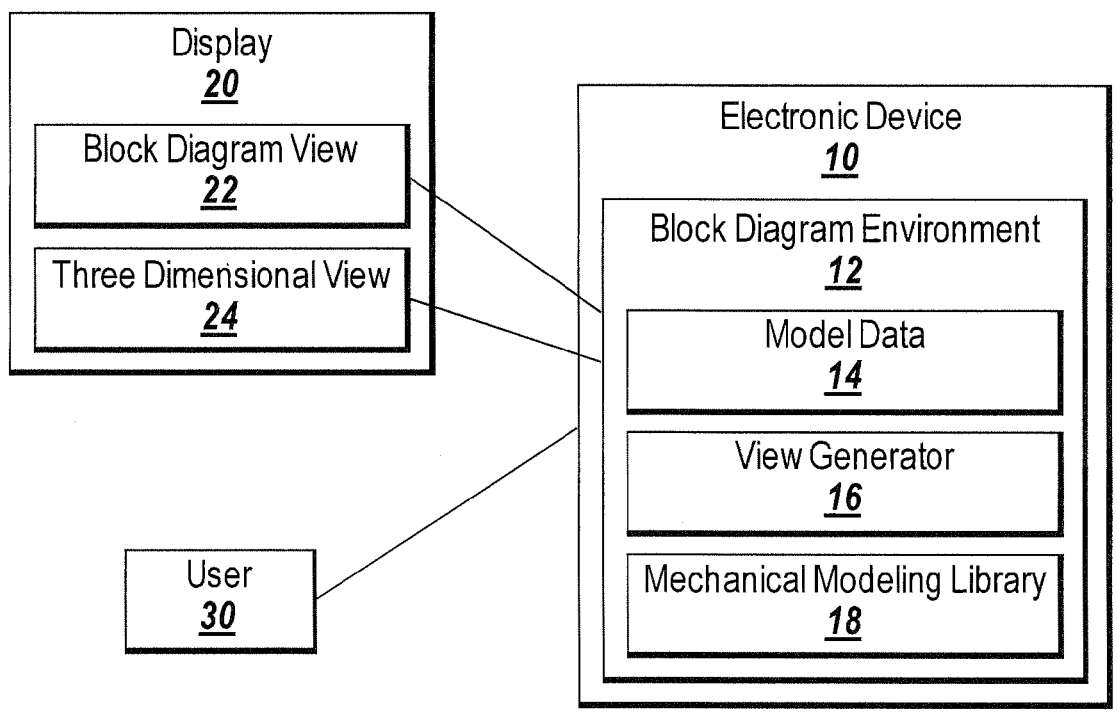
FIG. 2 depicts an environment suitable for practicing the illustrative embodiment of the present invention.

FIG. 2 depicts an environment suitable for practicing the illustrative embodiment of the present invention. An electronic device 10 supports a block diagram environment 12. The electronic device 10 may be a server, workstation, laptop, personal computer, PDA (Personal Digital Assistant), or some other type of electronic device equipped with a processor and capable of supporting the block diagram environment 12. The block diagram environment 12 such as the Simulink® environment, includes at least one collection of block diagram model data 14, a view generator 16 and may include or be interfaced with a mechanical modeling library 18. The model data 14 is a collection of data regarding a system being modeled by the block diagram environment.

A mechanical modeling library 18, such as the SimMechanics® application works in conjunction with the block diagram environment 12. The mechanical modeling library 18 includes blocks enabling the simulation of forward dynamics, inverse dynamics, kinematics, linearization, and trimming to determine the steady state equilibrium points for linearization and analysis. A mechanical modeling library enables the modeling of user defined bodies specified by mass properties and coordinate systems which are connected to one another by joints that express degrees of freedom of the system.

Kinematic constraints on the allowed motions of the systems bodies may be imposed. The constraints use Simulink® signals to restrict relations between the body motions and drive body motions as functions of time. The block diagram environment blocks and the mechanical modeling library block may be interfaced via actuator and sensor blocks. Actuator blocks specify the forces and motions of bodies or joints using Simulink® signals and enable the specification of a body or joint motion as position, velocity, or acceleration functions of time. The actuator blocks also enable the detection of discrete events arising from discontinuous friction forces and enable the preparation of a systems initial state from a dynamic simulation. The sensor blocks may be used to detect the motion of bodies and joints as Simulink® signals. The sensor blocks may be used to display system position, velocity, and acceleration in a Simulink® scope block. The sensor block may also be used to monitor forces in a system during a simulation.

The block diagram environment 12 is interfaced with a display surface or device 20 that includes a block diagram view 22 of the system being modeled and a three-dimensional view 24 of the system being modeled. The block diagram view 22 models the system by depicting the model data 14 as a series of blocks and lines representing model components and connections. For example, FIG. 1A (prior art) represents a block diagram view 22 of a four cylinder engine. The three-dimensional view 24 models the components represented in the model data 14 of the system being modeled as an integrated whole.

For example, FIG. 1B (prior art) represents a type of three-dimensional view of a block diagram model. The illustrative embodiment of the present invention, however, in addition to providing a block diagram view and a three-dimensional view of the system being modeled, also synchronizes the block diagram view 22 and the three-dimensional view 24 such that changes in a view or the underlying model data may be reflected programmatically in a corresponding view(s). A user 30 may make changes either in the block diagram model data 14 directly or via the user interface available through the block diagram view 22 or three-dimensional view 24.

Figure 3:
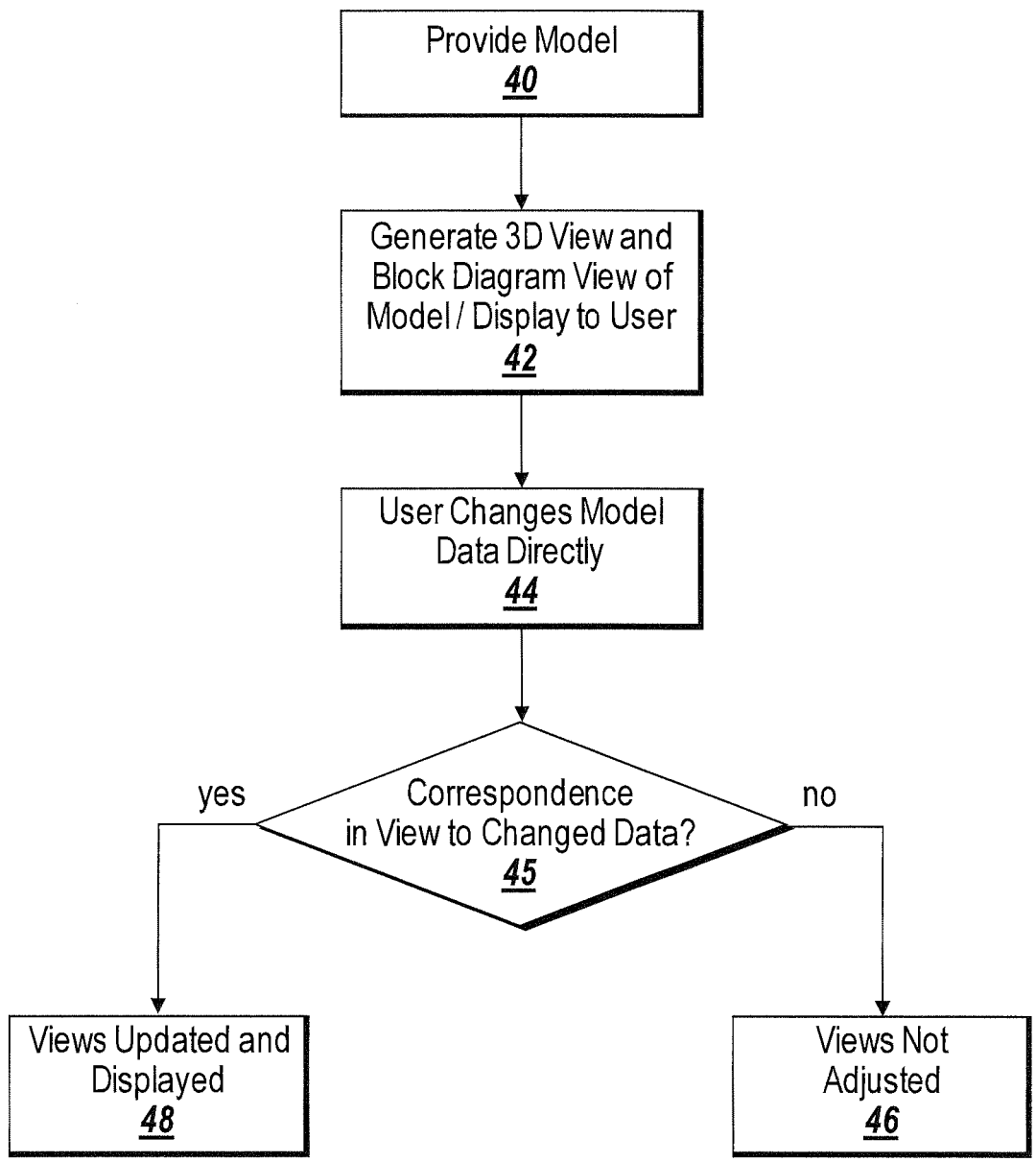
FIG. 3 is a flow chart of the sequence of steps followed by the illustrative embodiment of the present invention to synchronize changes in the underlying model data with the block diagram and three-dimensional views of the block diagram model.

The sequence of steps by which the illustrative embodiment of the present invention programmatically changes both the block diagram view 22 and the three-dimensional view 24 in response to changes in the underlying model data 14 is depicted in FIG. 3. The sequence begins with the creation or retrieval of a block diagram model data 14 in the block diagram environment 12 (step 40). The view generator 16 uses the model data 14 to generate a block diagram view 22 and three-dimensional view 24 of the system being modeled which are displayed to the user (step 42). Subsequently, a user-selected change in the model data 14 (step 44) is performed.

The block diagram view 22 and three-dimensional view 24 are examined by the view generator 16 to determine if each of the views contains a point of correspondence to the altered model data (step 45). In the event that no point of correspondence in the block diagram view 22 or three-dimensional view 24 is detected by the view generator 16, the view is left alone and not updated (step 46). However, in the event a point of correspondence in either the block diagram view 22 or three-dimensional view 24 is detected, a change is made to the view containing the point of correspondence and the updated view is displayed to the user (step 48).

Not every piece of model data 14 will have a corresponding component in the block diagram view 22 and/or three-dimensional view 24. Some data necessary to model and simulate the system does not translate well into a visual component. Additionally, some pieces of data may be visualized in one view and not the other. Certain components and features which are necessary and desirable to display in the three-dimensional view 24 do not need to be displayed in the block diagram view 22. Similarly, hierarchical connections which are desirable in the block diagram view 22 may not be desirable or able to be shown in the three-dimensional view 24.

The model data 14 includes attributes indicating whether the component should be displayed in the block diagram view and/or the three dimensional view. The view generator 16 checks the attributes in the model data to determine whether the altered data belongs in an updated view. The determination as to which type of components/features of components in the model data should be rendered in the views is an implementation choice and can be dependent upon a number of factors including but not limited to the ease of rendering the data in a comprehensible manner and the user's desire as to the amount of detail that should be displayed. The illustrative embodiment of the present invention enables both views to be quickly utilized by the user during the construction of a model without forcing all of the features to be shown in a single diagram. Depending upon the user's need for a particular feature, the user may consult the appropriate diagram.

Those skilled in the art will recognize that a lack of correspondence between the model data 14 and a view may be handled in a number of different ways without departing from the scope of the present invention. As noted above, the lack of correspondence may be handled by updating the model data 14 and not updating the view. Alternatively, the user may be queried to determine if a corresponding component should be added to the view. In the event of an indication from the user 30 that the non-corresponding component should be added to the view, the view generator 16 may use information regarding the component found in either the block diagram environment 12 or the mechanical modeling library 18 to add the component to the view. In a different implementation, the non-corresponding component may be added to the view automatically without user input.

Figure 4:
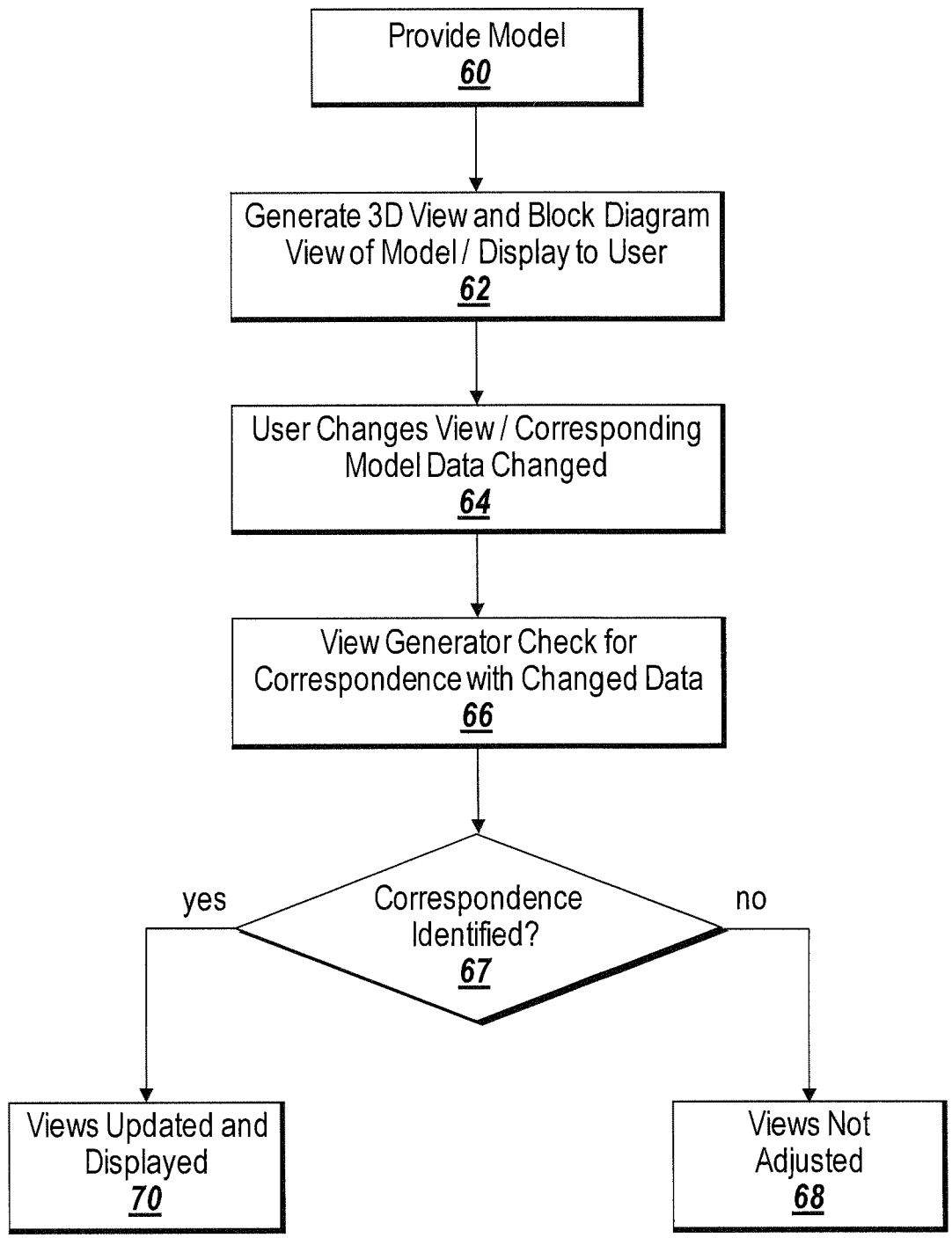
FIG. 4 depicts the sequence of steps followed by the illustrative embodiment of the present invention to synchronize changes in the block diagram view with the three-dimensional view of the block diagram model.

The illustrative embodiment of the present invention synchronizes the three dimensional view 24 with the block diagram view 22 so as to programmatically reflect changes in one view caused by an alteration in the other view. FIG. 4 illustrates the process followed by the illustrative embodiment of the present invention to synchronize a user's changes in the block diagram view 22 with the three dimensional view 24 or vice-versa.

The sequence of steps begins with the creation or retrieval of a block diagram model (step 60). The corresponding block diagram view 22 and three-dimensional view 24 are then generated and displayed to the user 30 by the view generator 16 (step 62). Subsequently, a user changes one of the views through a user interface associated with the view and the corresponding model data supporting that view is also changed (step 64). The block diagram view or three-dimensional view may be changed in a number of different ways via the user interface provided with the view.

Those skilled in the art will realize that there are a number of mechanisms available to enable the user (30) to manipulate the components displayed in the block diagram view 22 or three-dimensional view 24. For example, the user may use a mouse to drag a component from one position to another on the display surface. Alternatively, the user may use a command line interface provided by the view to add an additional component or reconfigure connections among the displayed components. Additionally, the displayed components may enable the user to adjust their properties such that the displayed version of the component is altered. All of the changes entered by the user are reflected in the underlying model data 14. Following the alteration of the model data 14, the view generator 16 checks the attributes associated with the changed data to determine if the non-altered view should include a displayed component corresponding to the altered data (step 66).

A determination is made as to whether or not a point of correspondence exists (step 67). In the event a point of correspondence does not exist the non-altered view may be left unchanged (step 68). Alternatively, if it is determined that a point of correspondence exists in the non-altered view for the model data that was altered, the view is updated by the view generator and displayed to the user (step 70). Accordingly, the user may cause changes in the three-dimensional view by altering the block diagram view. Alternatively, manipulation of the three-dimensional display of a system being modeled may result in the generation of an altered block diagram of the model. Additionally, those skilled in the art will recognize that determinations of non-correspondence may be handled in a manner similar to that discussed above following direct user changes to the model data (i.e.: the user may be queried regarding adding the component, the component may added automatically, etc.).

The illustrative embodiment of the present invention includes two methods of programmatically updating the second view as a result of user changes to the first view. In one implementation, the user may edit either the block diagram view 22 of the system being modeled or the three-dimensional view 24 until such time as the user has completed editing. The changes are queued and saved by the view generator 16 until such time as the user indicates the completion of the editing process. Upon completion, a determination is made as to whether the other view that was not originally altered is a candidate for alteration. In the event of correspondence or user or programmatic decision to add the component to a view, the changes may be retrieved from the queue by the view generator. Alternatively, the illustrative embodiment of the present invention may be implemented so as to dynamically update the view that the user is not working on even while changes are ongoing with the users selected view.

Figure 5:
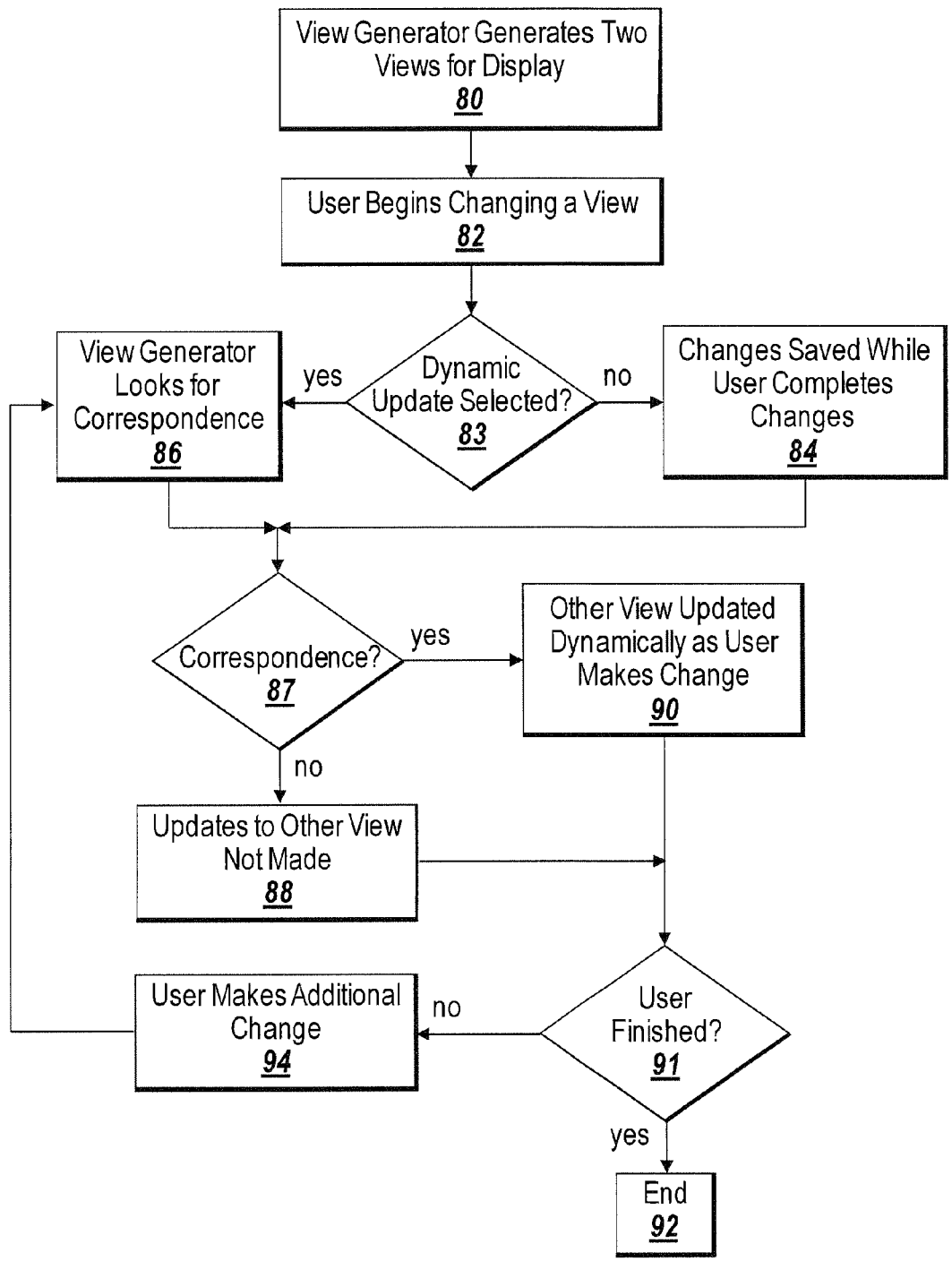
FIG. 5 depicts the sequence of steps followed by the illustrative embodiment of the present invention to update views in response to user changes.

FIG. 5 is a flow chart depicting the sequence of steps followed by the illustrative embodiment of the present invention to execute the dynamic and delayed updating implementations. The sequence begins when the view generator 16 generates the two views for display to the user, the block diagram view 22 and the three-dimensional view 24 of the system being modeled (step 80). Subsequently, the user selects either the block diagram view 22 or three-dimensional view 24 and begins altering the components displayed in the view via a user interface associated with the view (step 82).

A view generator 16 determines whether dynamic updating has been selected by the user (step 83). In the event dynamic updating has not been selected by the user 30, the view generator saves any changes made by the user until such time as the user has completed the editing and alteration process (step 84). Alternatively, if the view generator determines that dynamic updating has been selected, the view generator looks for a point of correspondence between the view being altered and edited by the user and the non-edited view (step 86). If a point of correspondence is not determined for the view not being altered by the user, no changes are made to the view (step 88).

In an alternative implementation, edited components/features which lack a point of correspondence in the other view may still be added to the other view in the manner discussed above. If a point of correspondence is determined by the view generator 16 the non-user edited view is updated dynamically while the user is continuing to make changes to the selected view (step 90). A determination is made as to whether a user is finished altering the selected view (step 91). If the user is finished updating the selected view, the process ends (step 92). Alternatively, if the user is not finished updating the selected components the view generator 16 waits until the user makes an additional change (step 94) whereupon the view generator begins to look for a point of correspondence for the new change (step 86). For the situations where the dynamic updating feature has not been selected, upon the user completing the alteration process, the view generator consults the saved changes and processes them in order checking for correspondence according to the process described above.

Exemplary embodiments of the invention can be configured to synchronize block diagram views, three-dimensional (3D) views, and textual views associated with one or more models. For example, in an embodiment, a user may interact with a textual interface to enter information used to construct and/or manipulate a block diagram view of a model and/or a multi-dimensional view (e.g., two, three, or more dimensional view) of the model. Textual inputs on behalf of the user may create components and/or connections in the block diagram view of the model and/or may create components and/or connections of the multi-dimensional view of the model. Exemplary embodiments may further maintain synchronization between information in the textual view, the block diagram view, and the multi-dimensional view of the model, such that a change to information in one view dynamically changes information in another view as needed.

Exemplary embodiments can further be configured to maintain synchronization between different views of a model when a model is animated (e.g., a moving simulation of a model). For example, a user may initialize a simulation of a model that causes a 3D view of the model to move in time. While the 3D view is moving, the user may see model components displayed in a block diagram view change color, shape, etc., and may see text for the model displayed in a textual view change size, flicker, etc. as portions of the model associated with the components or text are executed. Exemplary embodiments may further allow a user to perform synchronized debugging of a model using a textual view, block diagram view and multi-dimensional view of a model.

FIGS. 6A-6D and FIGS. 7-9 illustrate an embodiment that can be used to synchronize interfaces containing textual information, block diagram views, and multi-dimensional views of a model. The embodiments of FIGS. 6A-9 are illustrative and other embodiments can be configured in other ways consistent with the teachings herein without departing from the spirit of the invention.

Figure 6A:
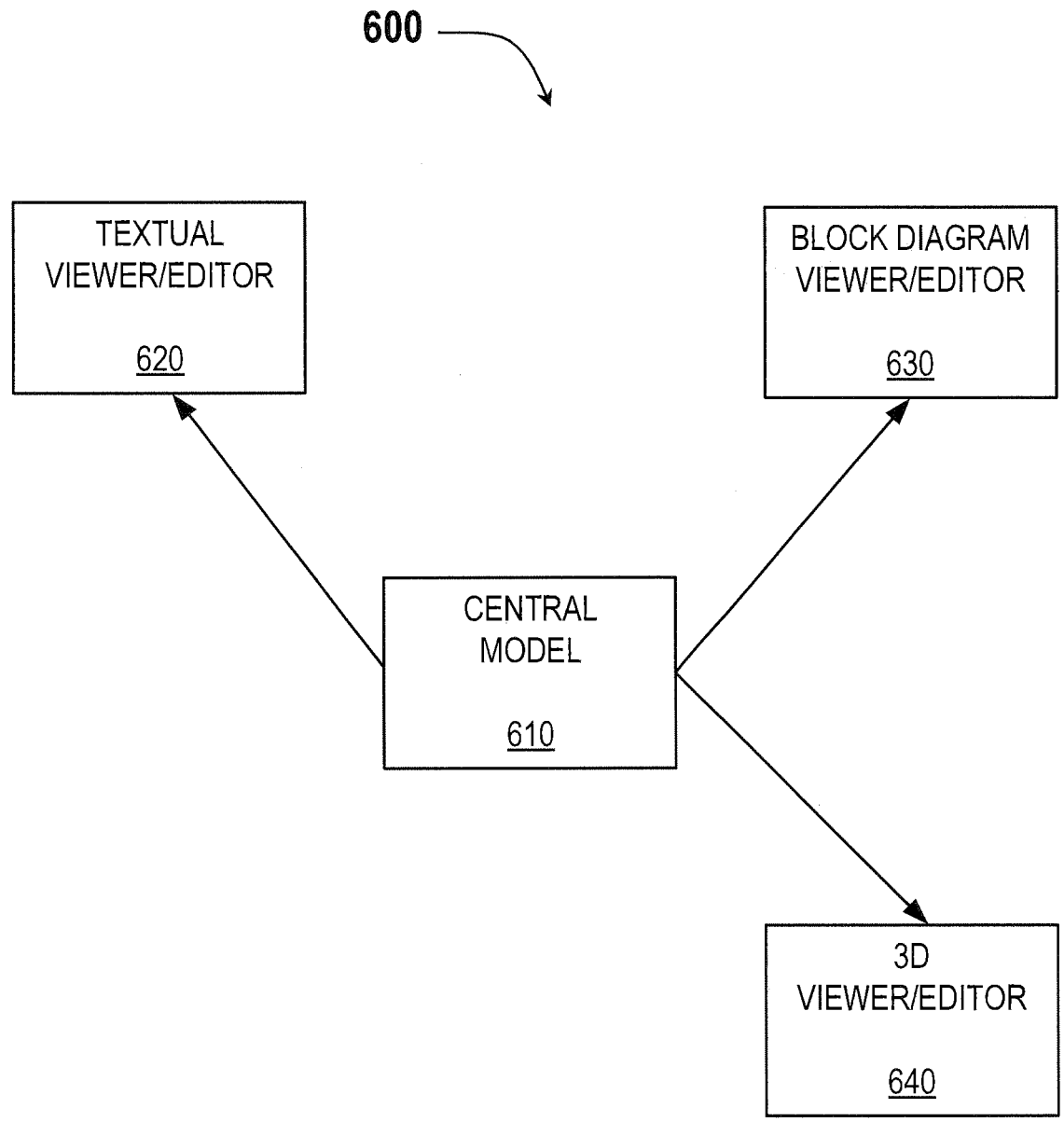
FIGS. 6A-6D illustrate exemplary configurations for practicing embodiments of the invention.

FIG. 6A illustrates configuration 600 that can include central model 610, textual viewer/editor 620 (hereinafter textual viewer 620), block diagram viewer/editor 630 (hereinafter block diagram viewer 630) and 3D viewer/editor 640 (hereinafter 3D viewer 640). Central model 610 may include a data store that holds information for a model of a system. In configuration 600, central model 610 may contain information for simulating the model, displaying information in textual viewer 620, block diagram viewer 630 and 3D viewer 640. For example, central model 610 may include textual values for forces, input signals, lengths, etc., coordinates for 3D views of components of the model, component identifiers, connections, ports, etc., for a block diagram representation of the model, etc.

In configuration 600, textual viewer 620, block diagram viewer 630 and 3D viewer 640 may also allow a user to create, edit, and/or delete respective textual, block diagram, and/or 3D information associated with a model. For example, a user may enter information via a keyboard and text may appear in textual viewer 620. The displayed information may be stored in central model 610 and the stored information may be used to update a block diagram view and/or to allow editing of the model displayed in block diagram viewer 630 and/or to update a 3D view of the model displayed in 3D viewer 640.

Figure 6B:
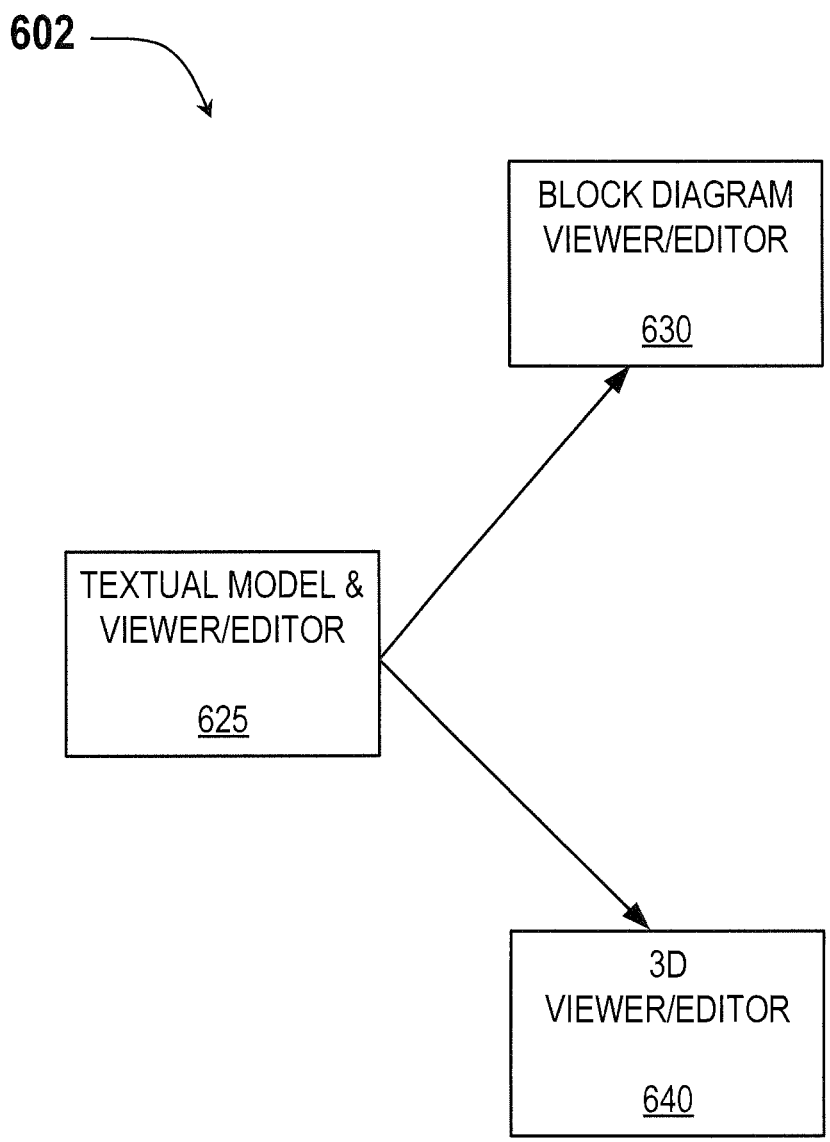

FIG. 6B illustrates a configuration 602 in which a textual model and viewer 625 store information for a model. In configuration 602, block diagram viewer 630 and 3D viewer 640 may interact with textual model and viewer 625 and may receive information used to provide a block diagram view or a 3D view of the model to a user.

Figure 6C:
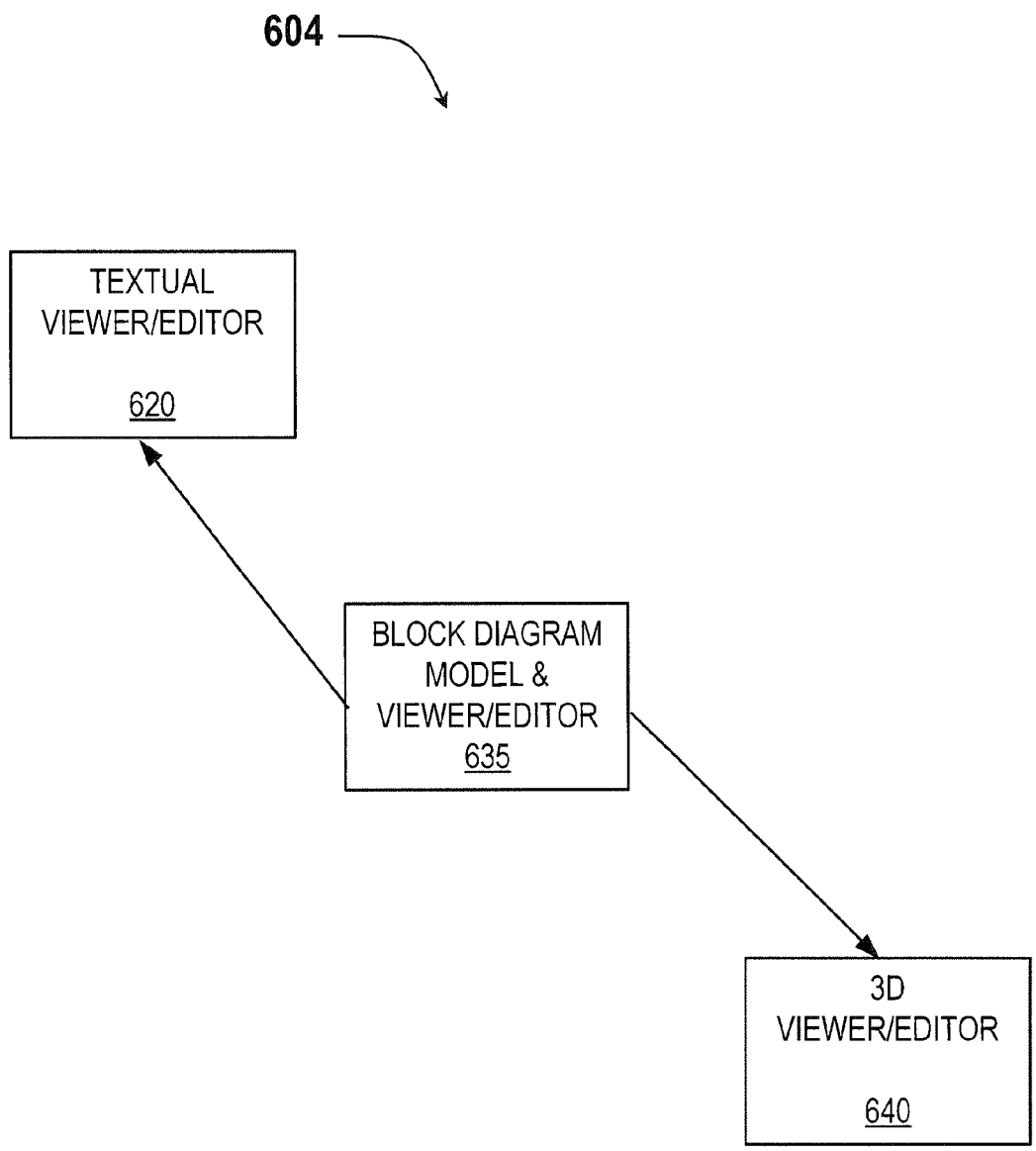

FIG. 6C illustrates a configuration 604 in which a block diagram model and viewer 635 store information for a model. In configuration 604, textual viewer 620 and 3D viewer 640 may interact with block diagram model and viewer 635 to display textual information and 3D image information, respectively, to a user.

Figure 6D:
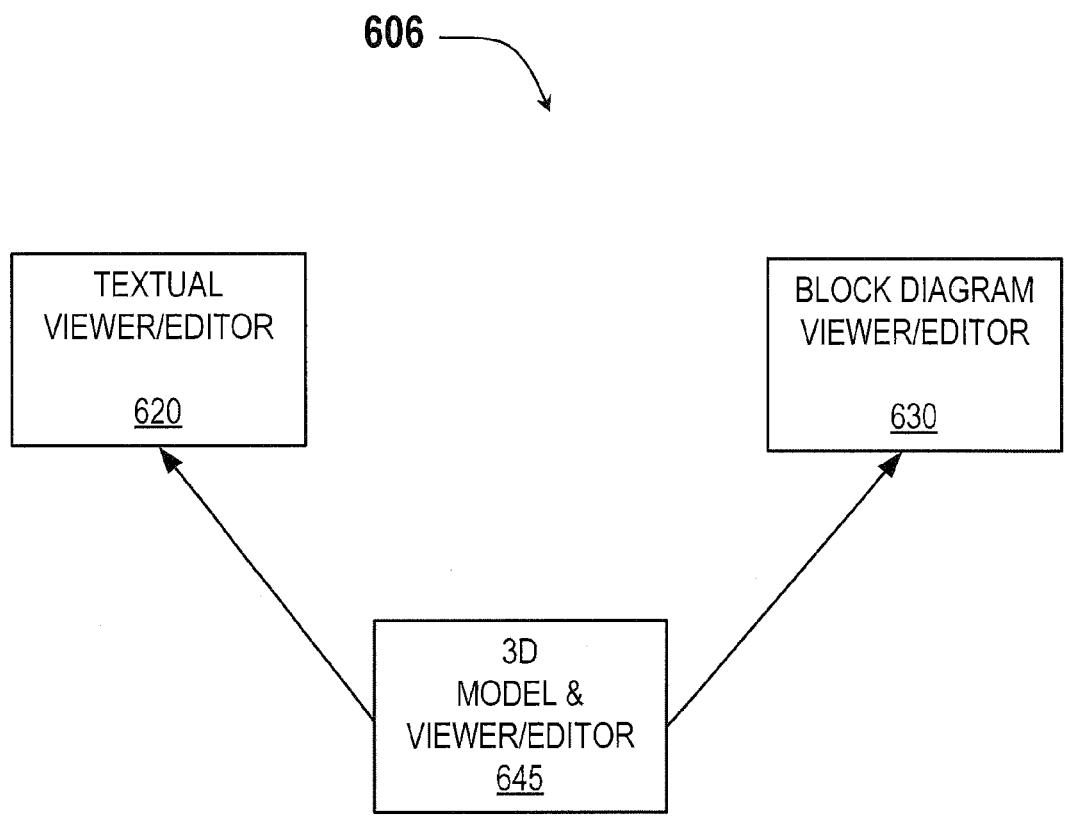

FIG. 6D illustrates a configuration 606 that includes a 3D model and viewer 645 that stores information for a model. In configuration, 606, textual viewer 620 and block diagram viewer 630 may interact with 3D model and viewer 645 to receive information for displaying textual information and 3D information, respectively, for the model.

Figure 7:
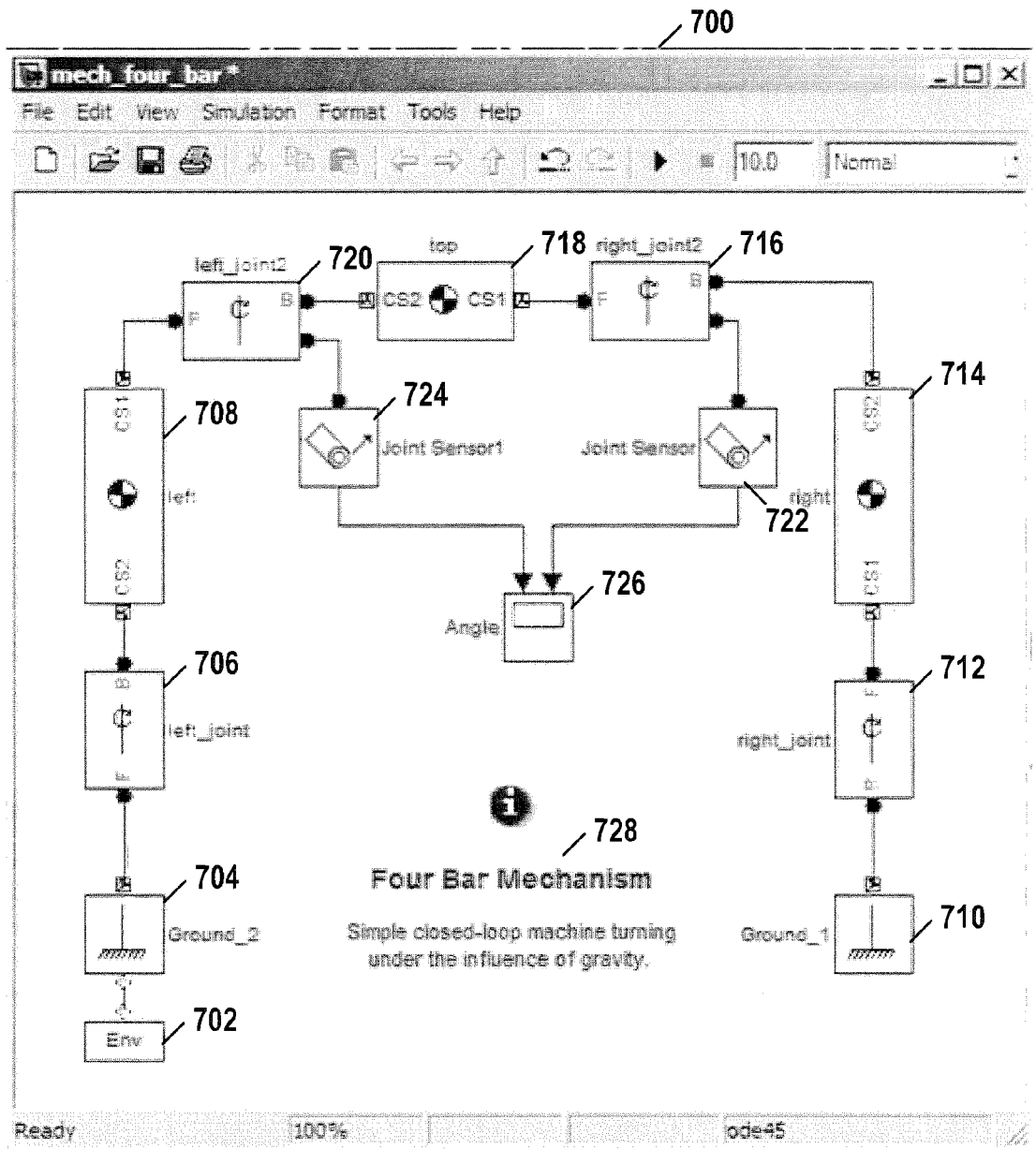
FIG. 7 illustrates an exemplary block diagram view of a model.

FIG. 7 illustrates a block diagram view 700 that can be displayed to a user via block diagram viewer 630. The model illustrated in view 700 may represent a system comprised of a four bar linkage. View 700 may display block diagram components and/or connections to a user. View 700 may also allow the user to add, delete, and/or modify components or connections in the model. For example, view 700 may include an environment component 702 (e.g., gravity), a first ground component 710, a second ground component 704, a left joint component 706, a left member component 708, a second left joint component 720, a right joint component 712, a right member component 714, a second right joint component 716, a top member component 718, a first joint sensor component 722, a second joint sensor component 724 and an angle readout component (e.g., a scope) 726.

View 700 may further represent connections between components using a representation, such as a line. Components and/or connections in view 700 may, or may not, be displayed in textual viewer 620 or 3D viewer 640 depending on user preferences, an image or text view, characteristics of a model, etc. For example, textual viewer 620 may display information about joints, members, dimensions, weights, forces, etc. In contrast, 3D viewer 640 may display joints and members, but may not display dimensions, joint sensors 722 and 725, angle readouts, etc.

View 700 may display block diagram components that collectively represent a model of a four bar linkage, where members of the linkage are moveably coupled to each other via joints.

Figure 8:
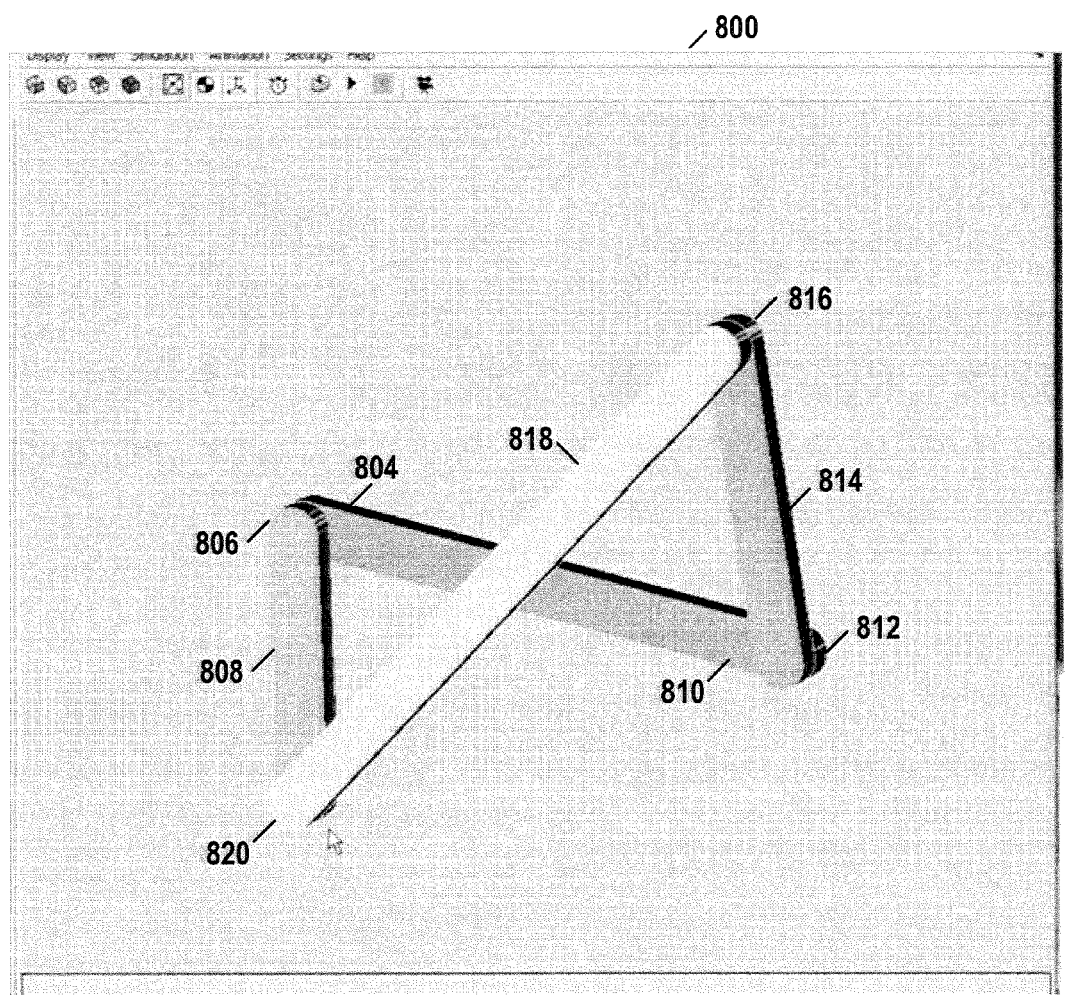
FIG. 8 illustrates an exemplary three dimensional view of a model.

FIG. 8 illustrates a representative 3D view of the four bar linkage associated with the block diagram of FIG. 7. For example, 3D view 800 may display information that can include region 804 corresponding to ground component 704 and region 810 corresponding to ground component 710. 3D view 800 may further include right member 814 that corresponds to right member component 714, lower right joint 812 that corresponds to right joint component 712, and upper right joint 816 that corresponds to second right joint component 716.

3D view 800 may further include left member 808 that corresponds to left member component 708, lower left joint 820 that corresponds to second left joint component 720, and upper left joint 806 that corresponds to left joint component 706. 3D view 800 may further include top member 818 that corresponds to top member component 718. The 3D image in view 800 may be manipulated by a user using textual viewer 620, block diagram viewer 630, a pointing device interacting with 3D view 800, etc.

For example, a user may enter a new dimension value for a member and the 3D image may be dynamically updated to reflect the updated dimension value. Alternatively, a user may enter an input that causes the 3D image to rotate with view 800. In another embodiment, a user may modify a component in block diagram view 700 and the 3D image may update and/or text displayed in textual viewer 620 may update to reflect the modified block diagram component.

FIGS. 9A and 9B collectively illustrate text that can represent some, or all, of the 3D model displayed in view 800. For example, a user may enter text to create bodies, or members, displayed in view 800 using text in region 902 of FIG. 9A. A user may further, or alternatively, create joints for the 3D model using text in region 904 of FIG. 9A.

In an embodiment, text entered by the user may create and/or modify components in block diagram view 700 of the model. Embodiments support the simultaneous manipulation of textual views, block diagram views, and multi-dimensional views of a model by synchronizing the various views. A user may further specify functions that can be applied to a model using textual viewer 620. For example, a user can enter text shown in FIG. 9B to further configure a model displayed in block diagram view 700 or 3D view 800.

CONCLUSION

Implementations may allow views of a model to be synchronized.

The foregoing description of exemplary embodiments of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 3, 4 and 5 the order of the acts may be modified in other implementations consistent with the principles of the invention. Further, non-dependent acts may be performed in parallel.

In addition, implementations consistent with principles of the invention can be implemented using devices and configurations other than those illustrated in the figures and described in the specification without departing from the spirit of the invention. For example, devices and/or entities may be added and/or removed from the implementations of FIGS. 2, 6A-D, and 7-9 depending on specific deployments and/or applications. Further, disclosed implementations may not be limited to any specific combination of hardware.

Further, certain portions of the invention may be implemented as "logic" that performs one or more functions. This logic may include hardware, such as hardwired logic, an application-specific integrated circuit, a field programmable gate array, a microprocessor, software, or a combination of hardware and software. No element, act, or instruction used in the description of the invention should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

Headings and sub-headings used herein are to aid the reader by dividing the specification into subsections. These headings and sub-headings are not to be construed as limiting the scope of the invention or as defining the invention.

The scope of the invention is defined by the claims and their equivalents.

We claim:

1. A computer implemented method, the method comprising:
   displaying model representations of a simulatable model of an executable system on a display device, where:
   the executable system includes a plurality of components,
   the simulatable model represents relations among the plurality of components of the executable system as functions of time, and
   the model representations include:
     a textual representation displayed via a textual viewing interface,
     a block diagram representation displayed via a block diagram viewing interface, and
     a three-dimensional representation displayed via a three-dimensional viewing interface;
   receiving an instruction on behalf of a user, where:
     the instruction identifies a modification to a selected view of the simulatable model, where the selected view is a view of one of:
       the textual representation of the simulatable model,
       the block diagram representation of the simulatable model, and
       the three-dimensional representation of the simulatable model;
   concurrently modifying, based on the identified modification, the textual representation, the block diagram representation and the three-dimensional representation of the simulatable model, the concurrently modifying including:
     synchronously updating one or more of the model representations not included in the selected view, where the synchronous updating occurs dynamically when the model representation of the selected view is modified; and
   displaying the modified textual representation, the modified block diagram representation and the modified three-dimensional representation of the simulatable model.

2. The method of claim 1 wherein the selected view is a view of the block diagram representation and the synchronously updated one or more model representations include the textual representation or the three-dimensional representation.

3. The method of claim 1 wherein the selected view is a view of the three dimensional representation and the synchronously updated one or more model representations include the textual representation or the block diagram representation.

4. The method of claim 1 wherein the selected view is a view of the textual representation and the synchronously updated one or more model representations include the three-dimensional representation or the block diagram representation.

5. The method of claim 1, where the simulatable model is stored in a central model.

6. One or more non-transitory computer-readable media storing executable instructions that, when executed on a processing device, cause the processing device to:
   display model representations of a simulatable model of an executable system in respective views, where:
   the executable system includes a plurality of components,
   the simulatable model represents relations among the plurality of components of the executable system as functions of time, and
   the model representations include:
     a textual representation displayed via a textual viewing interface,
     a block diagram representation displayed via a block diagram viewing interface, and
     a three-dimensional representation displayed via a three-dimensional viewing interface;
   receive an instruction on behalf of a user, where:
     the instruction identifies a modification to a selected view of the simulatable model, where the selected view is a view of one of:
       the textual representation of the simulatable model,
       the block diagram representation of the simulatable model, and
       the three-dimensional representation of the simulatable model;
   concurrently modify, based on the identified modification, the textual representation, the block diagram representation and the three-dimensional representation of the simulatable model, the concurrently modifying including:
     synchronously updating one or more of the model representations not included in the selected view, where the synchronous updating occurs dynamically when the model representation displayed in the identified view is modified; and
   display the modified textual representation, the modified block diagram representation and the modified three-dimensional representation of the simulatable model.

7. The media of claim 6 wherein the selected view is a view of the block diagram representation and the synchronously updated one or more model representations include the textual representation or the three-dimensional representation.

8. The media of claim 6 wherein the selected view is a view of the three dimensional representation and the synchronously updated one or more model representations include the textual representation or the block diagram representation.

9. The media of claim 6 wherein the selected view is a view of the textual representation and the synchronously updated one or more representations include the three dimensional representation or the block diagram representation.

10. The media of claim 6, where the simulatable model is stored in a central model.

11. One or more non-transitory computer-readable media storing executable instructions that, when executed on a processing device, cause the processing device to:
 display model representations of a simulatable model of an executable system in respective views, wherein:
  the executable system includes a plurality of components,
  the simulatable model represents relations among the plurality of components of the executable system as functions of time, and
  the views include:
   a textual representation of the simulatable model displayed via a textual viewing interface,
   a block diagram representation of the simulatable model displayed via a block diagram viewing interface, and
   a three-dimensional representation of the simulatable model displayed via a three-dimensional viewing interface;
 receive an instruction on behalf of a user, where:
  the instruction initializes a simulation of the simulatable model, and
  the simulation causes the three-dimensional representation of the simulatable model to change with respect to time; and
 concurrently modify the textual representation, the block diagram representation and the three-dimensional representation of the simulatable model, the concurrently modifying including:
  synchronously updating the textual representation and the block diagram representation of the simulatable model, where the synchronous updating occurs dynamically when the three-dimensional representation of the simulatable model changes with respect to time; and
 display the modified textual representation, the modified block diagram representation and the modified three-dimensional representation of the simulatable model.

* * * * *

UNITED STATES PATENT AND TRADEMARK OFFICE
CERTIFICATE OF CORRECTION

PATENT NO. : 8,674,983 B1  
APPLICATION NO. : 12/835247  
DATED : March 18, 2014  
INVENTOR(S) : Jeff Wendlandt et al.

It is certified that error appears in the above-identified patent and that said Letters Patent is hereby corrected as shown below:

Title page, column 2, References Cited under "Other Publications", line 1, delete "Daynamic" and insert --Dynamic-- in lieu thereof.

Signed and Sealed this  
Seventh Day of October, 2014

Michelle K. Lee  
*Deputy Director of the United States Patent and Trademark Office*